United States Patent [19]

Suzuki et al.

[11] Patent Number: 5,377,267
[45] Date of Patent: Dec. 27, 1994

[54] METHOD OF AUTHENTICATION WITH IMPROVED SECURITY FOR SECRECY OF AUTHENTICATION KEY

[75] Inventors: Shigefusa Suzuki, Saitama; Tatsuo Nohara, Tokyo, both of Japan

[73] Assignee: Nippon Telegraph and Telephone Corporation, Tokyo, Japan

[21] Appl. No.: 107,227

[22] Filed: Aug. 16, 1993

[30] Foreign Application Priority Data

Aug. 19, 1992 [JP] Japan .................................. 4-220386

[51] Int. Cl.⁵ ........................ H04L 9/32; H04M 11/00
[52] U.S. Cl. ........................................ 380/23; 379/62; 340/825.34
[58] Field of Search ................ 380/23, 24, 25; 379/62; 340/825.34

[56] References Cited

U.S. PATENT DOCUMENTS 5,153,919 10/1992 Reeds, III et al. ................ 380/23 X
5,233,656 8/1993 Langrand et al. ..................... 380/23
5,241,598 8/1993 Raith ................................ 380/23 X

FOREIGN PATENT DOCUMENTS 0480833 10/1991 European Pat. Off.
9003290 6/1990 WIPO .
9100066 1/1991 WIPO .
9104970 7/1991 WIPO .

OTHER PUBLICATIONS

European Search Report dated Dec. 6, 1993 (EP 93113282.3).

*Primary Examiner*—Gilberto Barrón, Jr.
*Attorney, Agent, or Firm*—Allegretti & Witcoff

[57] ABSTRACT

A method of subscriber authentication suitable for a roaming service in a telecommunication capable of realizing an improved security for the secrecy of the authentication key. In this method, an authentication data indicative of a tentative authentication key to be used only in the authentication at the second network is transmitted from the second network to the first network, and the first network enciphers this authentication data by using a permanent authentication key shared between the first network and the mobile subscriber, and transmits this enciphered authentication data to the mobile subscriber via the second network, such that the mobile subscriber can decipher this enciphered authentication data by using the permanent authentication key to obtain the tentative authentication key and subsequently carry out the authentication at the second network by using the obtained tentative authentication key, without explicitly disclosing the permanent authentication key to the second service provider.

10 Claims, 6 Drawing Sheets

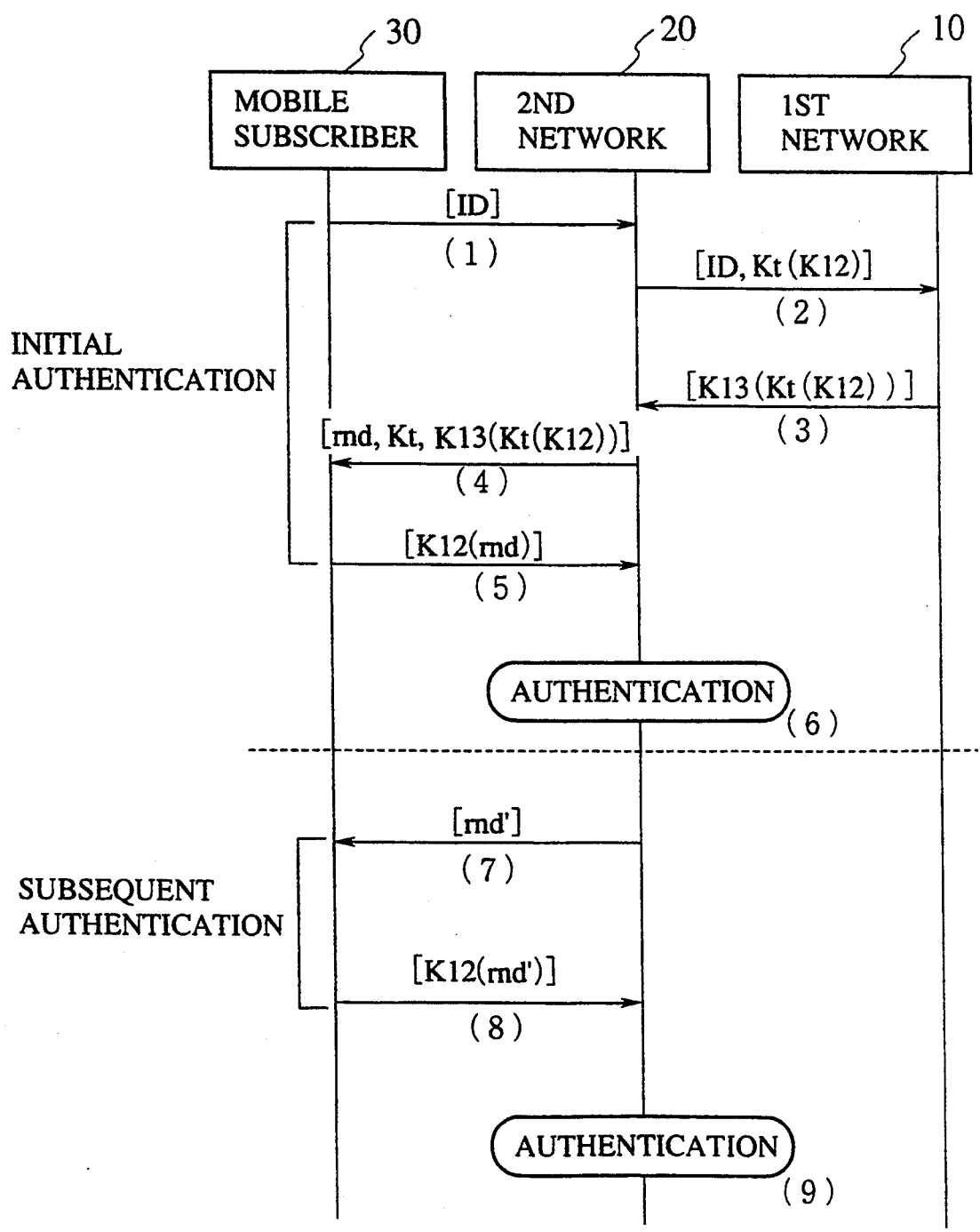

METHOD OF AUTHENTICATION WITH IMPROVED SECURITY FOR SECRECY OF AUTHENTICATION KEY

BACKGROUND OF THE INVENTION

1. Field of the Invention

The present invention relates to a subscriber authentication suitable for a so called roaming service in a telecommunication in which a mobile subscriber can receive services from a plurality of service providers, each of which having its own mobile telecommunication network.

2. Description of the Background Art

A known mobile telecommunication system has a typical configuration as shown in FIG. 1, which comprises: a first mobile telecommunication network (first network) 10 for a mobile telecommunication service provided by a first service provider, having a base station or switching center 11 and a service area 12; a second mobile telecommunication network (second network) 20 for a mobile telecommunication service provided by a second service provider, having a base station or switching center 21 and a service area 22; a mobile subscriber 30 who is basically a subscribed user of the first service provider, but also capable of receiving the roaming service from the second service provider as well; and an on-line communication line 40 for connecting the first network 10 and the second network 20.

In such a mobile telecommunication system, each of the first and second networks 10 and 20 constantly transmits a broadcast information for identifying itself within its own service area, so that the mobile subscriber 30 can recognize which network's service area it is currently located as well as an occurrence of a zone transition from a service area of one network to a service area of another network, by receiving this broadcast information regularly.

Now, in the currently practiced mobile telecommunication services, the aforementioned roaming service, in which the mobile subscriber 30 can receive services from a plurality of service providers such as the first and second service providers of the above example where each service provider has its own mobile telecommunication network such as the first and second networks 10 and 20, has not yet been established, so that there is no prior art for the subscriber authentication for the roaming service.

However, when the conventionally known subscriber authentication procedure used in the conventional automobile telephone service is straightforwardly applied to a case of the roaming service in the mobile telecommunication system of FIG. 1, the resulting subscriber authentication procedure can be expressed by the diagram of FIG. 2, as follows.

Namely, when the mobile subscriber 30 recognizes the occurrence of the zone transition from the first network 10 to the second network 20 according to the received broadcast information, the mobile subscriber 30 transmits its own mobile station identifier [ID] to the second network 20 at a process (1). This mobile station identifier [ID] is a unique identification number assigned in advance to the mobile subscriber 30 by the first service provider, and the second network 20 registers the mobile station identifiers of those mobile subscribers of the first network 10 who are capable of receiving the roaming service from the second network 20, which are informed from the first network 10 in advance.

Then, the second network 20 receiving this transmitted mobile station identifier [ID] from the mobile subscriber 30 checks whether this mobile subscriber 30 is one of the subscribers capable of receiving the roaming service from the second network 20 or not, according to the preregistered mobile station identifiers.

When the mobile subscriber 30 is judged as capable of receiving the roaming service from the second network 20, the second network 20 transmits the received mobile station identifier [ID] to the first network 10 via the on-line communication line 40 at the process (2).

When the first network 10 receives the mobile station identifier [ID] from the second network 20, the first network 10 returns an authentication key [K13] assigned and given to the mobile subscriber 30 by the fist service provider in advance, through the on-line communication line 40 at the process (3).

Then, the second network 20 stores this authentication key [K13], while generating a random number to be used for the authentication, and transmits the generated random number [rnd] as an authentication request to the mobile subscriber 30 at the process (4).

In response, the mobile subscriber 30 enciphers the received random number [rnd] by using the authentication key [K13] given by the first service provider in advance, and transmits the enciphered random number [K13(rnd)] as an authentication response to the second network 20 at the process (5).

When the second network 20 receives this authentication response from the mobile subscriber 30, the second network 20 deciphers this authentication response by using the stored authentication key [K13] to recover the random number enciphered by the mobile subscriber 30, and verifies the coincidence of the recovered random number and the originally transmitted random number [rnd]. When this coincidence can be verified successfully, the mobile subscriber 30 is authenticated as the true mobile subscriber of the first service provider which is also capable of receiving the roaming service from the second network 20 at the process (6), which completes the initial authentication of the mobile subscriber 30.

After this initial authentication, the second network 20 memorizes the correspondence between the mobile station identifier [ID] and the authentication key [K13], so that the subsequent authentication such as that required at a time of each call set up request from the mobile subscriber 30 can be carried out in a simplified procedure including a transmission of a new random number [rnd'] from the second network 20 to the mobile subscriber 30 at the process (7), a transmission of an enciphered new random number [K13(rnd')] from the mobile subscriber 30 to the second network 20 at the process (8), and the verification of a deciphered new random number at the second network 20 at the process (9).

However, in such a subscriber authentication procedure, the authentication key, which should essentially be kept in secret between the mobile subscriber 30 and the first service provider, must be disclosed to the totally independent second service provider, so that there is a problem concerning the security for the secrecy of the authentication key.

SUMMARY OF THE INVENTION

It is therefore an object of the present invention to provide a method of subscriber authentication suitable for a roaming service in a telecommunication capable of realizing an improved security for the secrecy of the authentication key.

According to one aspect of the present invention there is provided a method of authentication for a mobile subscriber to receive a roaming service by moving from a first communication network owned by a first service provider to a second communication network owned by a second service provider, comprising the steps of: (a) transmitting a mobile station identifier uniquely assigned to the mobile subscriber by the first service provider, from the mobile subscriber to the second communication network, when the mobile subscriber moved from the first communication network to the second communication network; (b) transmitting the mobile station identifier transmitted at the step (a) along with an authentication data indicative of a tentative authentication key to be used only in an authentication at the second communication network, from the second communication network to the first communication network; (c) transmitting an enciphered authentication data obtained at the first communication network by enciphering the authentication data transmitted at the step (b) by using a permanent authentication key shared by the first communication network and the mobile subscriber, from the first communication network to the mobile subscriber via the second communication network; (d) deciphering the enciphered authentication data transmitted at the step (c) by using the permanent authentication key to obtain the tentative authentication key at the mobile subscriber; and (e) carrying out the authentication at the second communication network by using the tentative authentication key obtained at the step (d) on the mobie subscriber side.

Other features and advantages of the present invention will become apparent from the following description taken in conjunction with the accompanying drawings.

BRIEF DESCRIPTION OF THE DRAWINGS

FIG. 6 is a diagram expressing an authentication procedure of a second embodiment of the method of authentication according to the present invention.

DETAILED DESCRIPTION OF THE PREFERRED EMBODIMENTS

Figure 1:
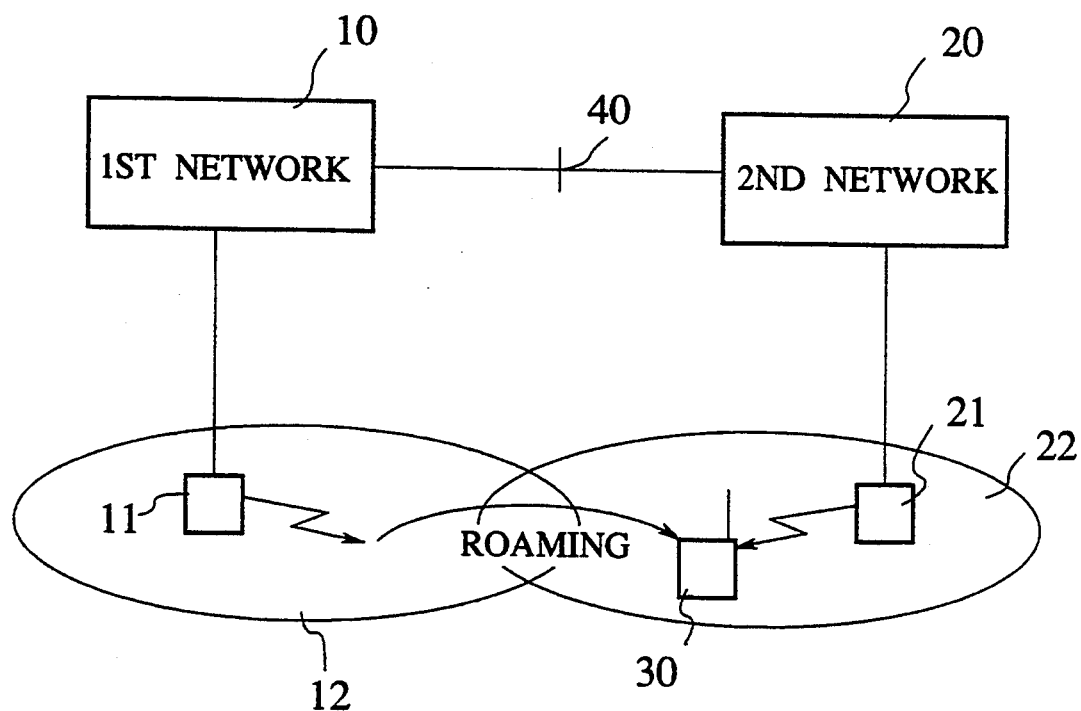
FIG. 1 is a schematic block diagram of a known mobile telecommunication system.
Figure 2:
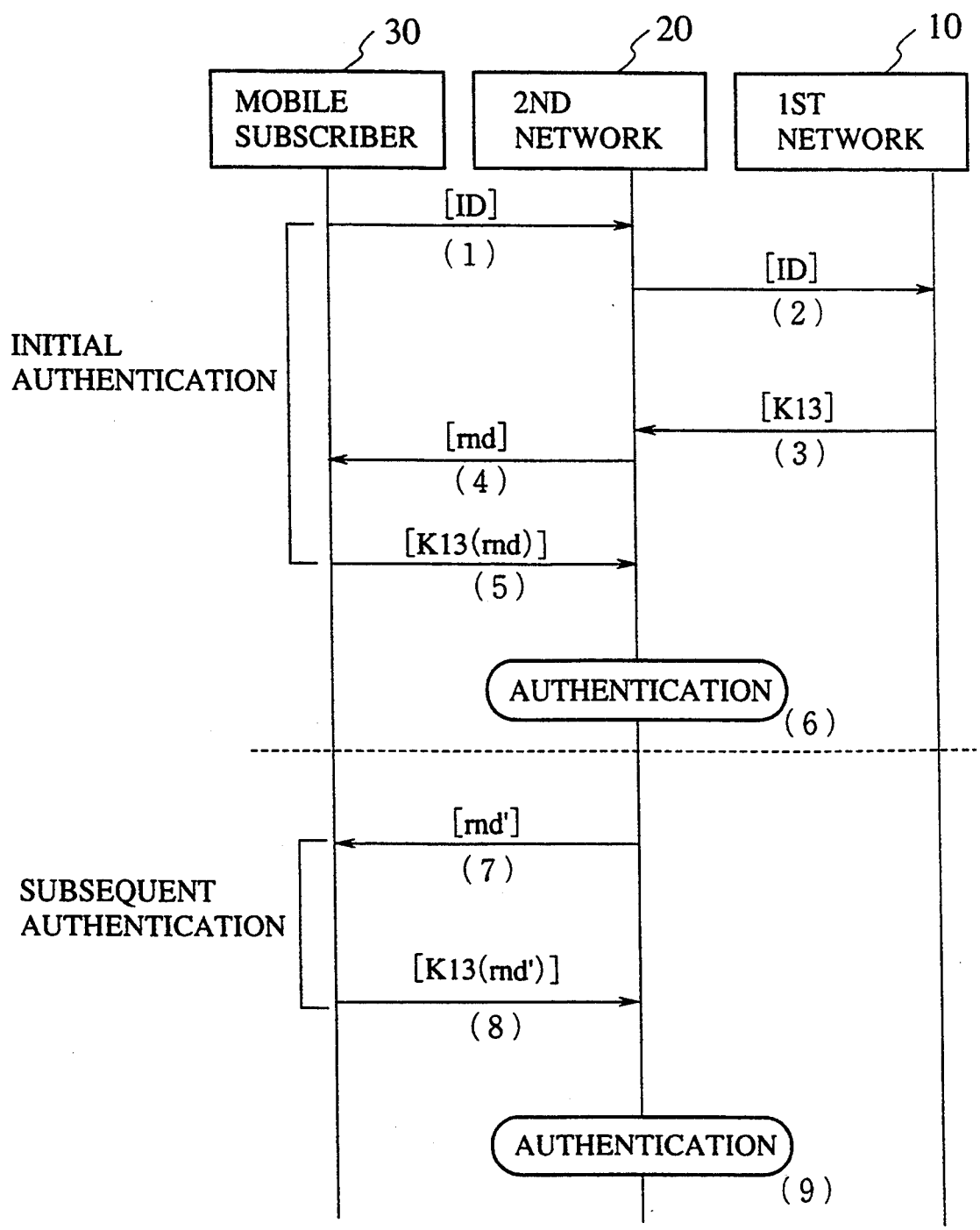
FIG. 2 is a diagram expressing an authentication procedure for the roaming service, obtained by applying a conventionally known subscriber authentication procedure for an automobile telephone service to the mobile telecommunication system of FIG. 1.

Now, the preferred embodiments of the method of authentication according to the present invention will be described with references to the drawings. In the following, the descriptions will be given for a case of implementing the present invention in the mobile telecommunication system having a configuration as shown in FIG. 1 described above.

In general, the method of authentication according to the present invention can be summarized as that which is characterized in that, an authentication data indicative of a tentative authentication key to be used only in the authentication at the second network is transmitted from the second network to the first network, and the first network enciphers this authentication data by using a permanent authentication key shared by the first network and the mobile subscriber, and transmits this enciphered authentication data to the mobile subscriber via the second network, such that the mobile subscriber can decipher this enciphered authentication data by using the permanent authentication key to obtain the tentative authentication key and subsequently carry out the authentication at the second network by using the obtained tentative authentication key, without explicitly disclosing the permanent authentication key to the second service provider.

Figure 3:
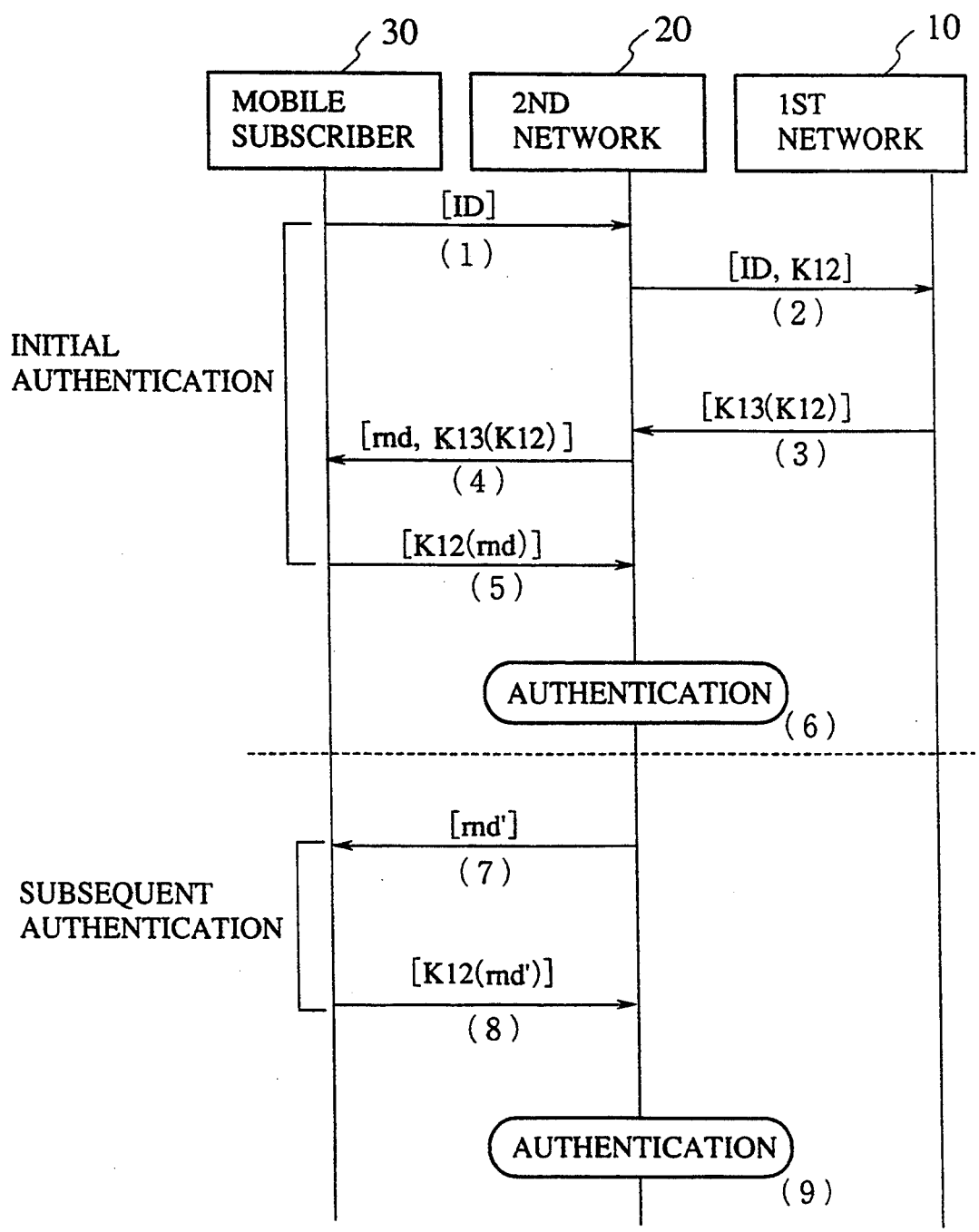
FIG. 3 is a diagram expressing an authentication procedure of a first embodiment of the method of authentication according to the present invention.

Referring now to FIG. 3, a first embodiment of the method of authentication according to the present invention will be described in detail.

In this first embodiment, the subscriber authentication procedure can be expressed by the diagram of FIG. 3, as follows.

Namely, when the mobile subscriber 30 recognizes the occurrence of the zone transition from the first network 10 to the second network 20 according to the received broadcast information, the mobile subscriber 30 transmits its own mobile station identifier [ID] to the second network 20 at a process (1). This mobile station identifier [ID] is a unique identification number assigned in advance to the mobile subscriber 30 by the first service provider, and the second network 20 registers the mobile station identifiers of those mobile subscribers of the first network 10 who are capable of receiving the roaming service from the second network 20, which are informed from the first network 10 in advance.

Here, It is also possible for the second network 20 to register only register a desired part of the mobile station Identifier of each mobile subscriber for the purpose of identifying a desired group of subscribers who are capable of receiving the roaming service from the second network 20. For example, the second network 20 may register only a part of the mobile station identifier of each mobile subscriber which identifies each mobile subscriber as the subscriber of the first network 10, in a case all the subscribers of the first network 10 are going to be capable of receiving the roaming service from the second network 20.

Then, the second network 20 receiving this transmitted mobile station identifier [ID] from the mobile subscriber 30 checks whether this mobile subscriber 30 is one of the subscribers capable of receiving the roaming service from the second network 20 or not, according to the preregistered mobile station identifiers.

When the mobile subscriber 30 is judged as capable of receiving the roaming service from the second network 20, the second network 20 transmits the received mobile station identifier [ID] along with a tentative authentication key [K12] to be used only in the authentication at the second network 20 to the first network 10 via the on-line communication line 40 at the process (2).

In response, the first network 10 checks whether the mobile station identifier [ID] received from the second network 20 is one of the mobile station identifiers of the formal subscribers of the first service provider, and when the mobile station identifier [ID] is confirmed as that of the formal subscriber of the first service provider, the first network 10 enciphers the received tentative authentication key [K12] by using the permanent authentication key [K13] assigned and given to the mobile subscriber 30 in advance by the first service provider, to obtain the enciphered authentication data [K13(k12)], and transmits this enciphered authentication data [K13(K12)] to the second network 20 through the on-line communication line 40 at the process (3).

Then, the second network 20 generates a random number [rnd] to be used for the authentication at the second network 20, and transmits the generated random number [rnd] along with the enciphered authentication data [K13(K12)] received from the first network 10 at the process (3), as an authentication request to the mobile subscriber 30 at the process (4).

In response, the mobile subscriber 30 deciphers the enciphered authentication data [K13(K12)] received from the second network 20 at the process (4), by using the permanent authentication key [K13] assigned and given to the mobile subscriber 30 in advance by the first service provider, to recover the tentative authentication key [K12], and enciphers the random number [rnd] received from the second network 20 at the process (4), by using the recovered tentative authentication key [K12] to obtain an authentication response indicating the enciphered random number [K12(rnd)], and then transmits this obtained authentication response to the second network 20 at the process (5).

Then, the second network 20 deciphers this authentication response received from the mobile subscriber 30 at the process (5) by using the tentative authentication key [K12] to recover the random number enciphered by the mobile subscriber 30, and verifies the coincidence of the recovered random number and the originally transmitted random number [rnd].

When this coincidence can be verified successfully, the mobile subscriber 30 is authenticated as the true mobile subscriber of the first service provider which is also capable of receiving the roaming service from the second network 20 at the process (6), which completes the initial authentication of the mobile subscriber 30.

Here, it is to be noted that instead of deciphering the authentication response to recover the enciphered random number first and then verifying the coincidence of the recovered random number and the originally transmitted random number [rnd], the second network 20 may encipher the originally transmitted random number [rnd] by using the tentative authentication key [K12] first and then verify the coincidence of the enciphered original random number and the received authentication response, if desired.

After this initial authentication, the second network 20 memorizes the correspondence between the mobile station identifier [ID] and the tentative authentication key [K12], so that the subsequent authentication such as that required at a time of each call request from the mobile subscriber 30 can be carried out in a simplified procedure including a transmission of a new random number [rnd'] from the second network 20 to the mobile subscriber 30 at the process (7), a transmission of an enciphered new random number K12(rnd')] obtained by using the tentative authentication key [K12] from the mobile subscriber 30 to the second network 20 at the process (8), and the verification of a deciphered new random number or the enciphered random number at the second network 20 at the process (9).

Thus, according to this first embodiment, the subscriber authentication for the roaming service can be achieved by disclosing only the tentative authentication key [K12] from the second network 20 to the first network 10, without explicitly disclosing the permanent authentication key [K13] to the second service provider, so that the security for the secrecy of the authentication key can be improved.

Here, it is to be noted that the tentative authentication key [K12] is to be used by the second network 20 and the mobile subscriber 30 only tentatively, and can be changed to some other tentative authentication keys in later occasions of the roaming service from the second network 20 to the mobile subscriber 30, so that the disclosure of the tentative authentication key [K12] to the first service provider would not raise a serious problem from a point of view of the security for the secrecy of the authentication key.

In addition, the requirement of the secrecy of the tentative authentication key [K12] is not very high because the mobile subscriber 30 is not a formal subscriber but only a tentative subscriber for the roaming service from a point of view of the second network 20.

It is to be noted that, in this first embodiment, each of the first and second service providers may own more than one networks. In such a case, the subscriber authentication in a case of zone transition from one service provider's network to another service provider's network needs to be carried out according to the diagram of FIG. 3 as described above, whereas the subscriber authentication in a case of zone transition among the same service provider's networks can be carried out in a simplified procedure including a transmission of the mobile station identifier [ID] from the mobile subscriber 30 to the network, a transmission of a random number from the network to the mobile subscriber 30, a transmission of an enciphered random number obtained by using either the permanent authentication key [K13] in a case of the first service provider or the tentative authentication key [K12] in a case of the second service provider from the mobile subscriber 30, and the verification of a deciphered random number or the enciphered random number at the network.

The similar situation also arises when each service provider provides more than one location registration areas, and the serive provider providing the roaming service regularly discards the tentative authentication key of the mobile subscriber even while the mobile subscriber is moving within the location registration areas of that same service provider.

Figure 4:
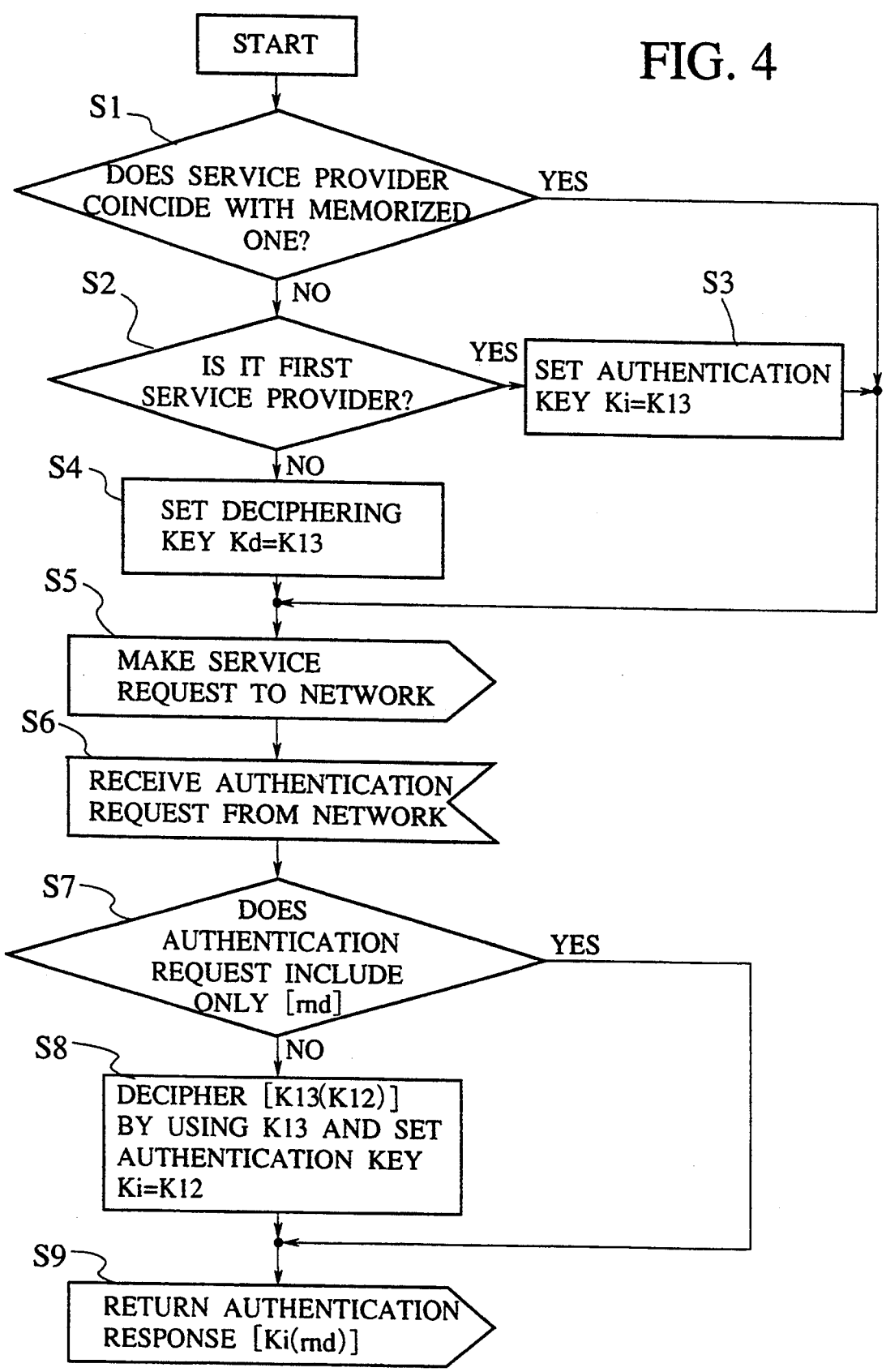
FIG. 4 is a flow chart for the operation of a mobile subscriber in a first embodiment of the method of authentication according to the present invention.

In this case, the operation to be carried out by the mobile subscriber 30 can be summarized by the flow chart of FIG. 4, as follows.

Namely, at the step S1, when the mobile subscriber 30 recognizes the occurrence of the zone transition from one network to another network according to the received broadcast information, the mobile subscriber 30 determines whether the service provider of the newly entering network coincides with that memorized in the mobile subscriber 30 indicating the service provider of the network from which the zone transition has originated, or not.

In a case it coincides, it implies that the zone transition has been that between the networks owned by the same service provider, so that the process proceeds to the step S5 to be described below. Otherwise, it implies that the zone transition has been that between the networks owned by the different service providers, so that the process proceeds to the next step S2.

At the step S2, the mobile subscriber 30 determines whether the service provider of the newly entering network is the first service provider for whom the mobile subscriber 30 is a formal subscriber, or not. In a case it is the first service provider, it implies that the zone transition has been that of returning from the other service provider's network to the original service provider's network, so that next at the step S3, the authentication key Ki is set equal to K13 and the process proceeds to the step S5. Otherwise, it implies that the zone transition has been that of moving from the original service provider's network to the other service provider's network, so that next at the step S4, the deciphering key Kd to be used at the process (5) of the above described procedure of FIG. 3 is set equal to K13 and the process proceeds to the step S5.

At the step S5, a service request is made from the mobile subscriber 30 to the newly entered network, by transmitting the mobile station Identifier [ID]. This step corresponds to the process (1) of the above described procedure of FIG. 3.

Then, at the step S6, the mobile subscriber 30 receives an authentication request from the newly entered network. This corresponds to the process (4) of the above described procedure of FIG. 3.

Next, at the step S7, the mobile subscriber 30 determines whether the received authentication request includes only the random number [rnd] or not. In a case the received authentication request includes something else such as the enciphered authentication data [K13(K12)] in addition to the random number [rnd], next at the step S8, the moblle subscriber 30 deciphers the enciphered authentication data [K13(K12)] received from the network by using the deciphering key Kd set at the step S4 to recover the tentative authentication key [K12], and sets the authentication key K1 equal to this recovered tentative authentication key [K12].

Then, at the step S9, the mobile subscriber 30 enciphers the random number [rnd] received from the network by using the currently set authentication key Ki to obtain the authentication response indicating the enciphered random number [Ki(rnd)], and then returns this obtained authentication response to the network. These steps S8 and S9 correspond to the process (5) of the above described procedure of FIG. 3.

It is also to be noted that, in this first embodiment, the subscriber authentication procedure according to the diagram of FIG. 3 can be carried out in conjunction with the location registration in the practical operation of the telecommunication system.

Figure 5:
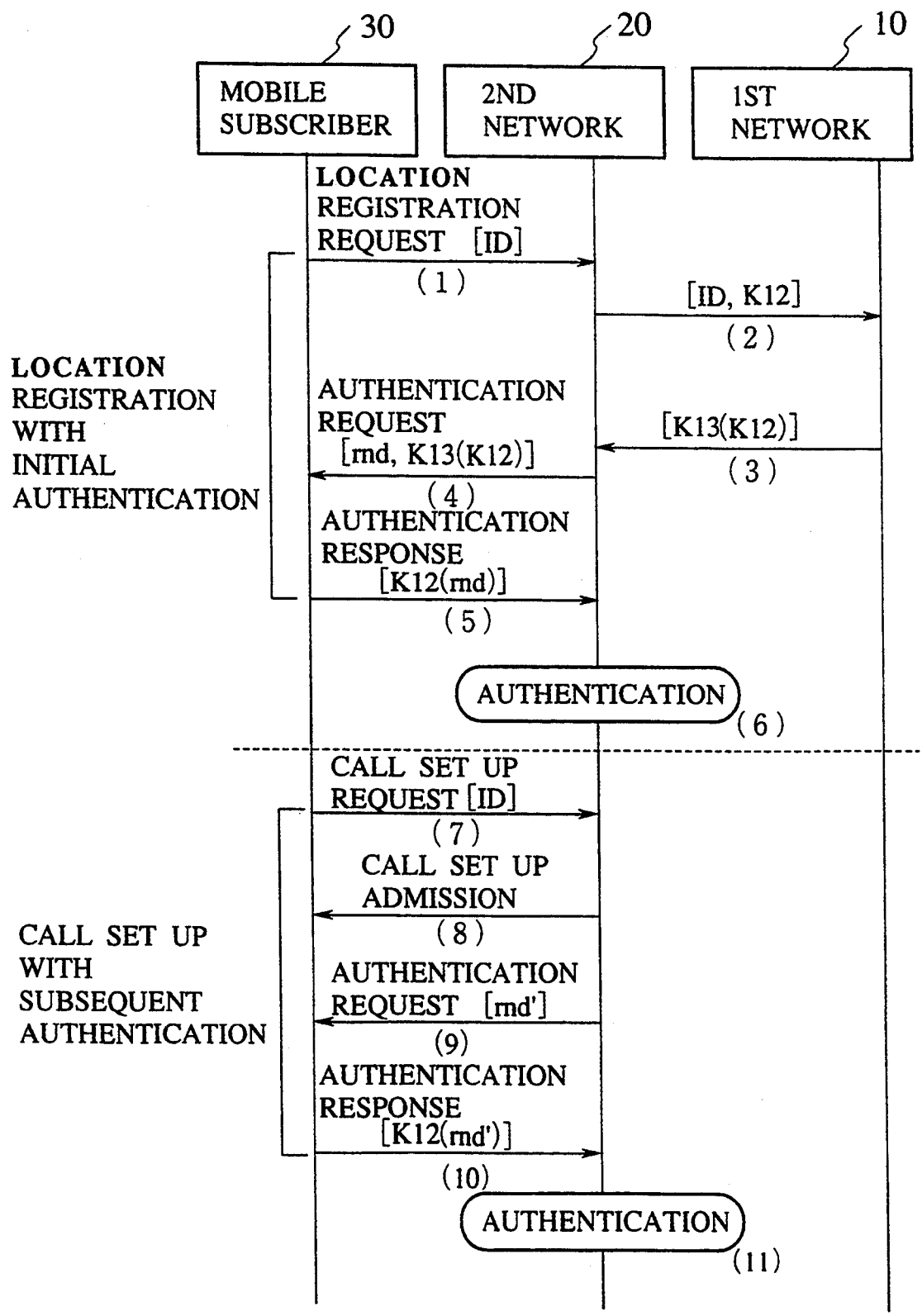
FIG. 5 is the diagram expressing an authentication procedure of a first embodiment of the method of authentication according to the present invention implemented in a location registration and call set up process.

Namely, when the mobile subscriber 80 recognizes the occurrence of the zone transition from the first network 10 to the second network 20 according to the received broadcast information, the location registration of the mobile subscrlber 80 by the second network 20 takes place, and the subscriber authentication procedure of this first embodiment can be carried out in conjunction with this location registration, according to the diagram of FIG. 5, as follows.

First, as the zone transition occurs, the mobile subscriber 30 transmits the location registration request containing its own mobile station identifier [ID] to the second network 20 at a process (1).

Then, the second network 20 receiving this location registration request from the moblle subscriber 30 checks whether this mobile subscriber 30 is one of the subscribers capable of receiving the roaming service from the second network 20 or not, according to the pre-registered mobile station identifiers.

When the mobile subscriber 30 is judged as capable of receiving the roaming service from the second network 20, the second network 20 generates the tentative authentication key [K12] for this moblle subscriber 30, and transmits this generated tentative authentication key [K12] along with the moblle station identifier [ID] contained in the received location registration request to the first network 10 via the on-line communication line 40 at a process (2).

In response, the first network 10 checks whether the mobile station Identifier [ID] received from the second network 20 is one of the mobile station identifiers of the formal subscribers of the first service provider, and when the mobile station identifier [ID] is confirmed as that of the formal subscriber of the first service provider, the first network 10 enciphers the received tentative authentication key [K12] by using the permanent authentication key [K13] asslgned and given to the moblle subscriber 30 in advance by the first service provider, to obtain the enciphered authentication data [K13(k12)], and transmits this enciphered authentication data [K13(K12)] to the second network 20 through the on-line communication line 40 at the process (3).

Then, the second network 20 generates a random number [rnd] to be used for the authentication at the second network 20, and transmits the generated random number [rnd] along with the enciphered authentication data [K13(K12)] received from the first network 10 at the process (3), to the mobile subscriber 30 at the process (4).

In response, the mobile subscriber 30 deciphers the enciphered authentication data [K13(K12)] received from the second network 20 at the process (4), by using the permanent authentication key [K13] assigned and glven to the mobile subscriber 30 in advance by the first service provider, to recover the tentative authentication key [K12], and enciphers the random number [rnd] received from the second network 20 at the process (4), by using the recovered tentative authentication key [K12] to obtain an authentication response Indicating the enciphered random number [K12(rnd)], and then transmits this obtained authentication response to the second network 20 at the process (5).

Then, the second network 20 deciphers this authentication response received from the mobile subscriber 30 at the process (5) by using the tentative authentication key [K12] to recover the random number enciphered by the mobile subscriber 30, and verifles the coincidence of the recovered random number and the originally transmitted random number [rnd].

When this coincidence can be verified successfully. the mobile subscriber 30 is authenticated as the true mobile subscriber of the first service provider which is also capable of receiving the roaming service from the second network 20 at the process (6), which completes the initial authentication of the mobile subscriber 30.

After this initial authentication, the second network 20 memorizes the correspondence between the mobile station identifier [ID] and the tentative authentication key [K12], so as to get ready for the subsequent authentication such as that required at a time of each call request from the mobile subscriber 30.

Namely, when the mobile subscriber transmits a call set up request containing its own mobile station identifier [ID] at the step (7), the second network 20 returns an call set up admission at the step (8), and then transmits an authentication request containing a new random number [rnd'] at the step (9), to the mobile subscriber 30.

Then, the mobile subscriber 30 enciphers the received random number [rnd'] by the memorized tentative authentication key [K12], and returns the authentication response indicating the enciphered random number [K12(rnd')] to the second network 20 at the step (10), and the verification of a deciphered new random number or the enciphered random number is carried out at the second network 20 at the process (11). When the verification is completed successfully, the second network 20 proceeds to the line connection processing in a usual manner.

Referring now to FIG. 6, a second embodiment of the method of authentication according to the present invention will be described in detail.

In this second embodiment, the subscriber authentication procedure can be expressed by the diagram of FIG. 6, as follows.

Namely, when the mobile subscriber 30 recognizes the occurrence of the zone transition from the first network 10 to the second network 20 according to the received broadcast information, the mobile subscriber 30 transmits its own mobile station identifier [ID] to the second network 20 at a process (1), and the second network 20 receiving this transmitted mobile station identifier [ID] from the mobile subscriber 30 checks whether this mobile subscriber 30 is one of the subscribers capable of receiving the roaming service from the second network 20 or not, according to the pre-registered mobile station identifiers, Just as in the first embodiment described above.

When the mobile subscriber 30 is judged as capable of receiving the roaming service from the second network 20, the second network 20 transmits the received mobile station identifier [ID] along with an authentication data [Kt(K12)] obtained by enciphering a tentative authentication key [K12] to be used only in the authentication at the second network 20 by using a temporary key [Kt], to the first network 10 via the on-line communication line 40 at the process (2).

In response, the first network 10 checks whether the mobile station identifier [ID] received from the second network 20 is one of the mobile station identifiers of the formal subscribers of the first service provider, and when the mobile station identifier [ID] is confirmed as that of the formal subscriber of the first service provider, the first network 10 enciphers this authentication data [Kt(K12)] by using the permanent authentication key [K13] assigned and given to the mobile subscriber 30 in advance by the first service provider, to obtain an enciphered authentication data [K13(Kt(K12))], and transmits this enciphered authentication data [KiJ(Kt(K12))] to the second network 20 through the on-line communication line 40 at the process (3).

Then, the second network 20 generates a random number [rnd] to be used for the authentication at the second network 20, and transmits the generated random number [rnd] along with the temporary key [Kt] transmitted to the first network1 10 at the process (2) and the enciphered authentication data [K13(Kt(K12))] received from the first network 10 at the process (3), to the mobile subscriber 30 at the process (4).

In response, the mobile subscriber 30 deciphers the enciphered authentication data [K13(Kt(K12))] received from the second network 20 at the process (4), by using the permanent authentication key [K13] assigned and given to the mobile subscriber 30 in advance by the first service provider and the temporary key [Kt] received from the second network 20 at the process (4), to recover the tentative authentication key [K12], and enciphers the random number [rnd] received from the second network 20 at the process (4), by using the recovered tentative authentication key [K12] to obtain an authentication response indicating the enciphered random number [K12(rnd)], and then transmits this obtained authentication response to the second network 20 at the process (5).

Then, the second network 20 deciphers this authentication response received from the mobile subscriber 30 at the process (5) by using the tentative authentication key [K12] to recover the random number enciphered by the mobile subscriber 30, and verifies the coincidence of the recovered random number and the originally transmitted random number [rnd], and when this coincidence can be verified successfully, the mobile subscriber 30 is authenticated as the true mobile subscriber of the first service provider which is also capable of receiving the roaming service from the second network 20 at the process (6), which completes the initial authentication of the mobile subscriber 30, Just as in the first embodiment described above.

Here, it is to be noted that instead of deciphering the authentication response to recover the enciphered random number first and then verifying the coincidence of the recovered random number and the originally transmitted random number [rnd], the second network 20 may encipher the originally transmitted random number [rnd] by using the tentative authentication key [K12] first and then verify the coincidence of the enciphered original random number and the received authentication response, Just as in the first embodiment described above.

After this initial authentication, the second network 20 memorizes the correspondence between the mobile station identifier [ID] and the tentative authentication key [K12], so that the subsequent authentication such as that required at a time of each call request from the mobile subscriber 30 can be carried out in a simplified procedure including a transmission of a new random number [rnd'] from the second network 20 to the mobile subscriber 30 at the process (7), a transmission of an enciphered new random number [K12(rnd')] obtained by using the tentative authentication key [K12] from the mobile subscriber 30 to the second network 20 at the process (8), and the verification of a deciphered new random number or the enciphered random number at the second network 20 at the process (9), just as in the first embodiment described above.

Thus, according to this second embodiment, the subscriber authentication for the roaming service can be achieved without explicitly disclosing the tentative authentication key [K12] from the second network 20 to the first network 10 while also not explicitly disclosing the permanent authentication key [K13] to the second service provider, so that the security for the secrecy of the authentication key can be further improved.

It is to be noted that, in the embodiments described above, the communication between the first and second networks 10 and 20 through the on-line communication line 40 may be replaced by the communication through an off-line communication means such as mails.

It is to be also noted that, although the embodiments have been described above for a case of a mobile telecommunication system, the method of authentication according to the present invention may be utilized in the other systems requiring the authentication, such as the on-line communication system and the machine banking system.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of authentication for a mobile subscriber to receive a roaming service by moving from a first communication network owned by a first service provider to a second communication network owned by a second service provider, comprising the steps of:
   (a) transmitting a mobile station identifier uniquely assigned to the mobile subscriber by the first service provider, from the mobile subscriber to the second communication network, when the mobile subscriber moved from the first communication network to the second communication network;
   (b) transmitting the mobile station identifier transmitted at the step (a) along with an authentication data indicative of a tentative authentication key to be used only in an authentication at the second communication network, from the second communication network to the first communication network;
   (c) transmitting an enciphered authentication data obtained at the first communication network by enciphering the authentication data transmitted at the step (b) by using a permanent authentication key shared by the first communication network and the mobile subscriber, from the first communication network to the mobile subscriber via the second communication network;
   (d) deciphering the enciphered authentication data transmitted at the step (c) by using the permanent authentication key to obtain the tentative authentication key at the mobile subscriber; and
   (e) carrying out the authentication at the second communication network by using the tentative authentication key obtained at the step (d) on the mobie subscriber side.

2. The method of claim 1, wherein the authentication data transmitted at the step (b) comprises the tentative authentication key itself.

3. The method of claim 1, wherein the authentication data transmitted at the step (b) comprises the tentative authentication key enciphered by a temporal key, and the second communication network transmits the temporal key along with the the enciphcred authentication data to the mobile subscriber at the step (c), such that the tentative authentication key is obtained at the step (d) by deciphering the enciphered authentication data by using both the permanent authentication key and the temporal key.

4. The method of claim 1, wherein at the step (e), the authentication at the second communication network is carried out by: transmitting a random number generated at the second communication network to the mobile subscriber along with the enciphered authentication data at the step (c); transmitting an enciphered random number obtained at the mobile subscriber by enciphering the transmitted random number by using the tentative authentication key obtained at the step (d) from the mobile subscriber to the second communication network; and verifying the coincidence of the random number enciphered at the mobile subscriber and the random number generated at the second communication network.

5. The method of claim 4, wherein the coincidence of the random number enciphered at the mobile subscriber and the random number generated at the second communication network is verified by deciphering the enciphered random number to obtain a deciphered random number and comparing the deciphered random number with the random number generated at the second communication network.

6. The method of clalm 4, wherein the coincidence of the random number enciphered at the mobile subscriber and the random number generated at the second communication network is verified by enciphering the random number generated at the second communication network by using the tentative authentication key to obtain an enciphered original random number and comparing the enciphered random number with the enciphered origlnal random number.

7. The method of claim 1, wherein at the step (a), the second communication network checks whether the mobile station identifier transmitted from the mobile subscriber is one of pre-reglstered mobile station identifiers of those mobile subscribers of the first service provider which are capable of receiving the roaming service from the second communication network.

8. The method of claim 1, wherein at the step (c), the first communication network checks whether the mobile subscriber is one of formal subscribers of the first service provider according to the transmitted mobile station identifier, and enciphers the authentication data by using the permanent authentication key corresponding to the transmitted mobile station identifier.

9. The method of claim 1, wherein the mobile subscriber memorizes the tentative authentication key obtained at the step (d) in order to subsequently carry out the authentication at the second communication network.

10. The method of clalm 1, whereln the second communication network memorizes a correspondence between the tentative authentication key indicated by the authentication data transmitted at the step (b) and the mobile station identifier received at the step (a) in order to subsequently carry out the authentication at the second communication network.

* * * * *